Feb. 2, 1971 ISAO KOZU ET AL 3,561,004

TRAY FOR TAPE CARTRIDGE CHANGER

Filed May 8, 1969 3 Sheets-Sheet 1

INVENTOR
ISAO KOZU
BY
Wenderoth, Lind & Ponack
ATTORNEYS

Feb. 2, 1971 ISAO KOZU ET AL 3,561,004

TRAY FOR TAPE CARTRIDGE CHANGER

Filed May 8, 1969 3 Sheets-Sheet 2

INVENTOR

ISAO KOZU

BY Wenderoth, Lind & Ponack

ATTORNEYS

Feb. 2, 1971 ISAO KOZU ET AL 3,561,004

TRAY FOR TAPE CARTRIDGE CHANGER

Filed May 8, 1969

3 Sheets-Sheet 3

INVENTOR
ISAO KOZU

BY Wenderoth, Lind & Ponack
ATTORNEYS

United States Patent Office

3,561,004

Patented Feb. 2, 1971

3,561,004

TRAY FOR TAPE CARTRIDGE CHANGER

Isao Kozu and Hidetoshi Kurihara, Osaka, Japan, assignors to Matsushita Electric Industrial Co., Ltd., Kadoma, Osaka, Japan Filed May 8, 1969, Ser. No. 822,925

Claims priority, application Japan, May 10, 1968, 43/31,771; May 13, 1968, 43/32,705, 43/32,706

Int. Cl. A47f *1/10;* B65d *83/00*

U.S. Cl. 206—1 5 Claims

ABSTRACT OF THE DISCLOSURE

A tray for a tape cartridge changer. The tray is provided with a frame which is capable of receiving a plurality of tape cartridges arranged side by side in a line, and has supporting means which are mounted on the frame for engaging the side faces of the cartridges to hold them in the frame. The supporting means are movable so that at least one of the cartridges can freely move through the tray when the tray is loaded on a tape cartridge changer.

This invention relates to a tray for holding a plurality of tape cartridges, and more particularly to a tray which can hold a plurality of tape cartridges and can be loaded on a tape cartridge changer and release successive cartridges for feeding to a tape deck for reproducing or recording of the tape in said cartridges.

Recently many magnetic tape cartridges, especially socalled "cassettes," have become available in the market, and various kinds of tape cartridge changers are now being developed throughout the world.

It is troublesome for an operator to load cartridges onto a changer one by one. After completion of recording or reproducing along one edge of the tape of all the cartridges on the changer, the operator has to turn the cartridges over one by one in order to record or reproduce along the other edge of the tapes in the cartridges. A tray which can hold a plurality of tape cartridges therein and which is detachable from the changer, is quite desirable not only for the purpose of storing the cartridges in a music library, but also for turning over all of the cartridges at one time.

It is, therefore, an object of the present invention to provide an improved tray capable of holding and storing a plurality of tape cartridges.

Another object of this invention is to provide a new and improved tray which can hold a plurality of tape cartridges and can release at least one of the cartridges to move through the tray when the tray is loaded on a tape cartridge changer.

The tray of this invention comprises a frame for holding a plurality of tape cartridges with said cartridges arranged side by side in a line, and supporting means mounted on said frame for holding the side faces of said cartridges in said frame. Said supporting means frees said cartridges to move through said frame when said supporting means is moved to its inoperative position by releasing means of a tape cartridge changer.

Further features and advantages of the invention will become apparent from the following detailed description take in connection with the accompanying drawings, in which:

FIGS. 1–5 show one embodiment of a tray of the present invention.

Figure 1:
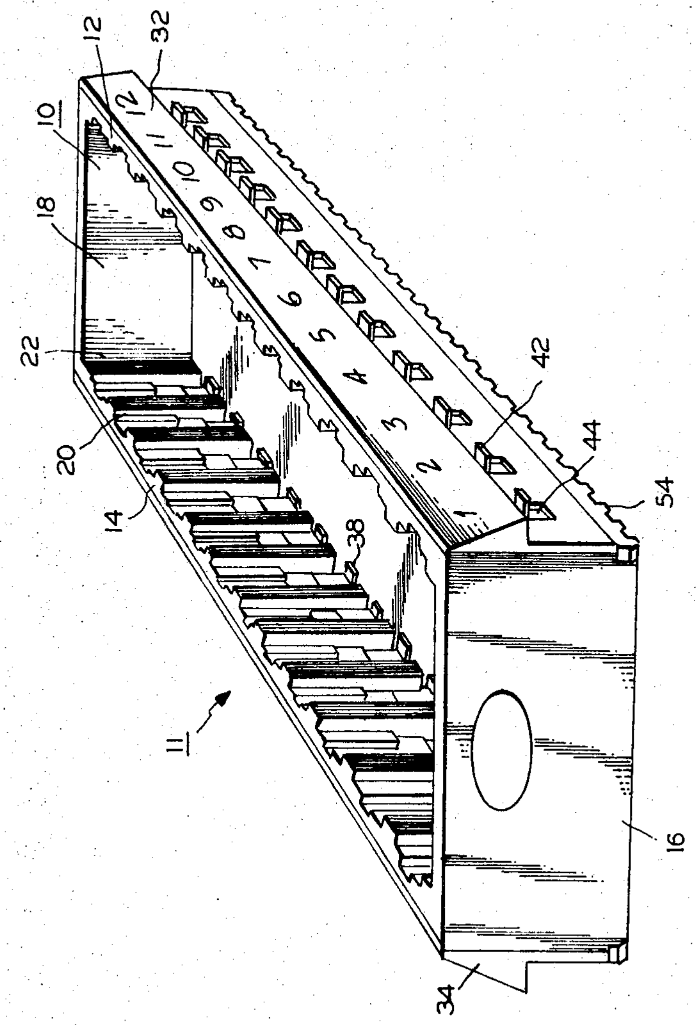
FIG. 1 is a perspective view of a tray embodying the invention.

Tray 11 comprises a frame 10 having two side walls 12 and 14, a front wall 16 and a rear wall 18. Said two side walls 12 and 14 have a plurality of elongated recesses 20 inside of the frame 10 extending transversely of the plane of the frame. Each pair of opposing recesses 20 forms a compartment 22 which is capable of holding a tape cartridge 24 therein. Therefore, a plurality of tape cartridges can be loaded in the compartments 22 so as to be arranged side by side in a line.

Figure 4:
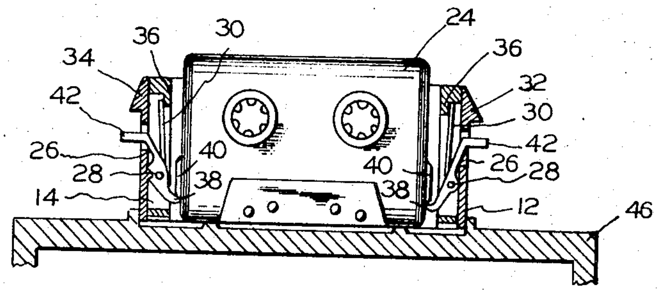
FIG. 4 is a transverse sectional view taken substantially along the line 4—4 of FIG. 2.
Figure 5:
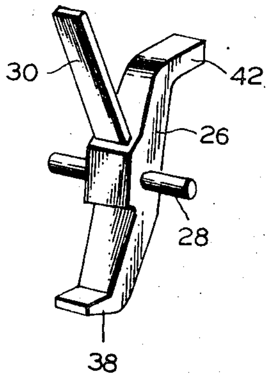
FIG. 5 is a perspective view of one supporting means which is disposed on said tray.

Supporting means for holding the cartridges 24 in the compartments 22 is disposed on both side walls 12 and 14, as will be explained in more detail hereinafter. With particular reference to FIGS. 4 and 5, the side walls 12 and 14 are provided with a plurality of supporting members 26, each of which has a horizontal axle 28 extending therethrough and a resilient spring plate 30 projecting upwardly therefrom. The supporting members 26 are mounted in recesses 20 so as to be rotatable around the axles 28 and with the cartridge supporting projection 38 on the lower end extending into the compartment 22 and the camming projection 42 on the other end projecting out of the side of the frame through an aperture in side plates 32 and 34, which are attached to the side walls 12 and 14. The upper end of spring plate 30 is engaged behind a downwardly extending projection at the top of the recess 20 to bias the cartridge supporting projection 38 toward a cartridge in the compartment 22.

The reaction of the spring plate 30 against the projection 36 in the recess 20 causes the cartridge supporting projection 38 to be pressed against the lower part of an ear 40 on the edge face of the tape cartridge 24 when the cartridge 24 is loaded in the tray 11, as shown in FIG. 4. Therefore, the cartridges 24 do not drop through the tray 11 even when the operator lifts the tray 11 in his hand.

If the camming projections 42 of one pair of the supporting member 26 for one compartment 22 are pressed inwardly against the biasing force of the spring plates 30, the cartridge supporting projections 38 on the members 26 will be disengaged from the ears 40 of the cartridge 24 in said compartment 22. Then said cartridge 24 will drop through the tray 11.

Figure 2:
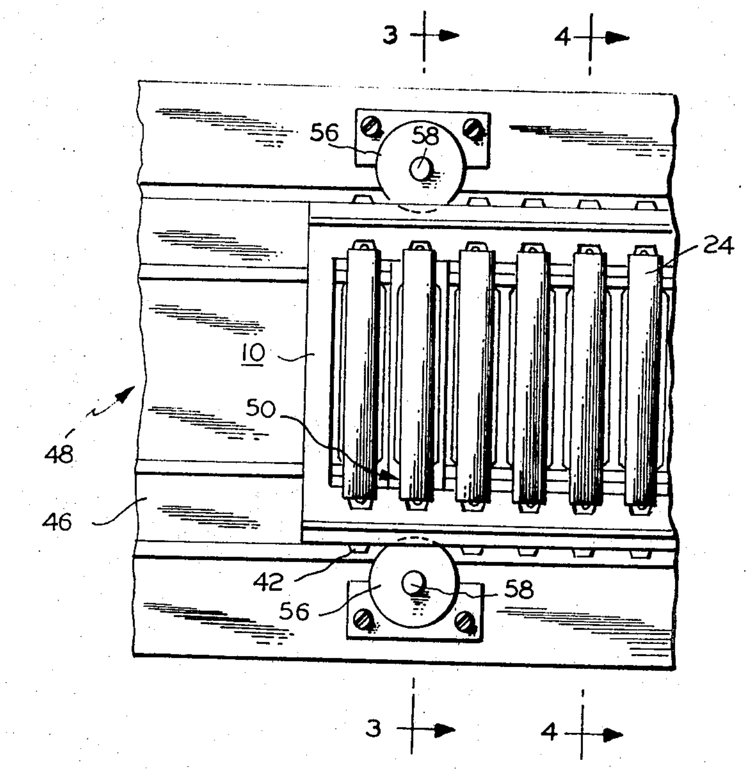
FIG. 2 is a partial top plan view wherein said tray is loaded on a certain type of a tape cartridge changer.
Figure 3:
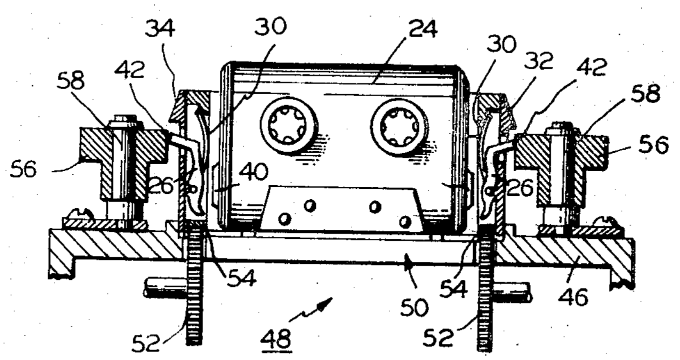
FIG. 3 is a transverse sectional view taken substantially along the line 3—3 of FIG. 2.

The tray 11 can be slidably seated on a guide plate 46 of a tape cartridge changer 48. This changer 48 has an insertion opening 50 and two driving gears 52. The driving gears 52 are meshed with racks 54 formed at the lower edge of the side walls 12 and 14 when the tray 11 is loaded on the changer 48 as shown in FIGS. 2 and 3. A pair of release rollers 56 are rotatably mounted on shafts 58 fixed to the guide plate 46 adjacent to the insertion opening 50. Said release rollers 56 press the camming projections 42 of one pair of supporting members 26 in the compartment 22 which is positioned just above the insertion opening 50, as shown in FIG. 3. Accordingly, the cartridge supporting projections 38 on said pair of supporting members 26 are moved outwardly away from the side faces of the cartridges 24 in said compartment 22, and said cartridges 24 are free to move from the tray 11 into the insertion opening 50. The cartride 24 can be transported downwardly by a suitable elevator (not shown) so as to engage with a suitable tape deck (not shown) for reproduction or recording of the tape in the cartridge 24. After completion of reproduction or recording, said cartridge 24 can be smoothly lifted back to its original position in the compartment 22.

After every cycle of cartridge exchanging motion of the changer 48, the driving gears 52 move the tray 11 one pitch of the aligned cartridges 24. Therefore, the just lifted cartridge 24 is engaged by the projections 38 again as the camming projections 42 move past the rollers 56, and the next succeeding cartridge is released.

Figure 6:
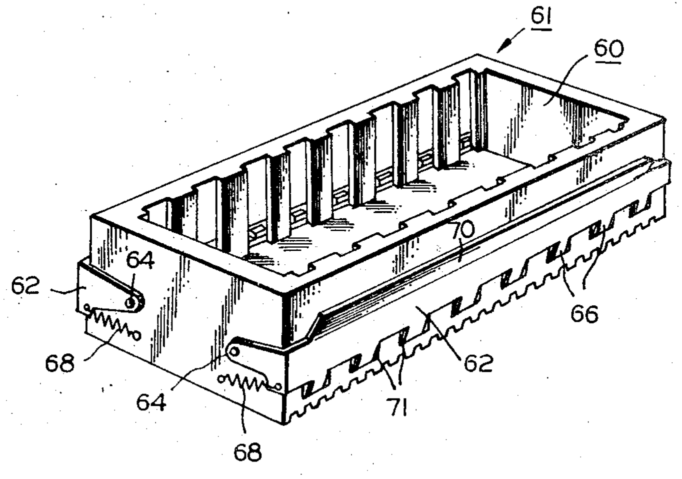
FIG. 6 is a perspective view of another embodiment of the tray of the present invention.

FIG. 6 shows another embodiment of the tray of the present invention. The frame 60 of a tray 61 of this embodiment is substantially the same as the frame 10 described above. The supporting means is modified, as will be explained hereinafter. A pair of supporting members 62 are rotatably mounted on said frame 60 on pivot pins 64. The supporting members 62 have a plurality of cartridge supporting projections 66 thereon projecting through apertures 71 in each slot defining a compartment. The supporting members 62 are biased by springs 68 so that projections 66 hold the cartridges as described in connection with the tray 11. An upper outwardly bent portion 70 is provided on each supporting member 62 for engagement with the release roller 56 of the changer 48 when the tray 61 is loaded onto the changer 48. In this embodiment, all of the engaging arms 66 are released from the side faces of the cartridges when the tray is placed in the changer, so that all of the cartridges are free to move through the tray 61. However, only the cartridge just above the insertion opening 50 can descend towards the tape deck. The descent of the others is prevented by the guide plate 46 of FIG. 2.

In the above mentioned embodiments, the tape cartridge has ears 40 on the edge faces thereof. It is also possible to use a cartridge without ears by increasing the frictional force between the supporting members and the edge faces of the cartridge enough to support the weight of the cartridge. If sufficient frictional force is achieved, there is no need to hold both edges of the cartridge, so that the supporting means mounted on the one side of the frame can be omitted.

It is apparent that various modifications may be made without departing from the spirit of the invention. The above described specific examples are intended merely to illustrate the various inventive facets in some selective embodiments of the invention, the scope of which it is intended shall be limited only by the appended claims.

We claim:

1. A tray for holding tape cartridges for a tape cartridge changer comprising a frame for a receiving a plurality of tape cartridges with said cartridges arranged side by side in a line and supporting means mounted on said frame and engagable with the edge faces of the cartridges, said supporting means being movable to free said cartridges to move through said frame.

2. A tray as claimed in claim 1 in which said supporting means has cartridge engaging projections thereon for engaging the cartridges under ears on the edge faces of the cartridges.

3. A tray as claimed in claim 1 in which said supporting means have camming projections thereon for moving said supporting means to free said cartridges so that they can move through said frame into an insertion opening of a tape cartridge changer when the tray is loaded on the cartridge changer.

4. A tray as claimed in claim 1 in which said frame has a plurality of compartments each of which can receive a tape cartridge therein; and said supporting means includes a plurality of supporting members mounted on the side walls of said frame and each having a resilient member engaged with said frame for urging said supporting members to hold said respective cartridges.

5. A tray as claimed in claim 4 in which said supporting members each have a camming projection thereon engagable with release rollers mounted on a tape cartridge changer for moving the supporting members away from the cartridges so that a cartridge located above an insertion opening of said changer can move into said opening.

References Cited

UNITED STATES PATENTS

| | | | |
|---|---|---|---|
| 2,402,044 | 6/1946 | Heckman | 312—17 |
| 2,591,266 | 4/1952 | Kuchel | 217—19 |
| 2,660,469 | 11/1953 | Schilling | 294—87 |
| 3,385,643 | 5/1968 | Adell | 312—10 |
| 3,439,127 | 4/1969 | Weigel | 179—100.2Z |

WILLIAM T. DIXSON, JR., Primary Examiner

U.S. Cl. X.R.

179—100.2; 221—86; 294—26, 69; 312—10, 17